United States Patent

Larmande et al.

[11] Patent Number: 6,070,849
[45] Date of Patent: Jun. 6, 2000

[54] RESILIENT SUSPENSION DEVICE FOR AN EXHAUST PIPE

[75] Inventors: Franck Larmande, Chateaudun; Christophe Roquain, Saint Lalais, both of France

[73] Assignee: Hutchinson, Paris, France

[21] Appl. No.: 09/008,200

[22] Filed: Jan. 16, 1998

[30] Foreign Application Priority Data

Jan. 17, 1997 [FR] France ................... 97 00474

[51] Int. Cl.[7] .............. F16L 55/33; F16F 3/10; F01N 7/18
[52] U.S. Cl. .............. 248/610; 248/60; 248/632
[58] Field of Search ................... 248/634, 636, 248/632, 638, 610, 58, 60, 74.2, 317; 267/141, 141.1, 152, 153; 180/89.2, 96, 309; 181/208, 207, 209

[56] References Cited

U.S. PATENT DOCUMENTS

| | | | |
|---|---|---|---|
| 4,274,761 | 6/1981 | Boguth | 405/232 |
| 4,415,391 | 11/1983 | Reid | 156/187 |
| 4,458,861 | 7/1984 | Mouille | 248/638 |
| 4,634,088 | 1/1987 | Schad | 248/60 |
| 4,727,957 | 3/1988 | Fujita | 248/60 |
| 4,817,909 | 4/1989 | Deane | 248/610 |
| 4,976,412 | 12/1990 | Simon et al. | 248/632 |
| 5,050,837 | 9/1991 | Hamada et al. | 248/610 |
| 5,271,595 | 12/1993 | Simon et al. | 248/632 |
| 5,433,422 | 7/1995 | Ross et al. | 267/140.15 |
| 5,829,732 | 11/1998 | Yamaguchi et al. | 248/58 |

Primary Examiner—Anita M. King
Assistant Examiner—Michael Nornberg
Attorney, Agent, or Firm—Marshall, O'Toole, Gerstein, Murray & Borun

[57] ABSTRACT

A resilient suspension device for the exhaust pipe of any vehicle having an internal combustion engine, the device comprising a resilient body provided with fastener means for fastening both to the structure of the vehicle and to said exhaust pipe. The device is characterized in that it includes at least one transverse bar 8 carrying a counter-oscillating mass M, the end 9 of said bar remote from said mass M being included in a zone 16 of said body which is subject to vibration, and said bar 8 being held in a location situated between said zone 16 and said mass M by a relatively fixed portion 10 of said body, forming a pivot.

4 Claims, 3 Drawing Sheets

RESILIENT SUSPENSION DEVICE FOR AN EXHAUST PIPE

The present invention relates to a resilient suspension device for the exhaust pipe of a vehicle having an internal combustion engine, the device comprising a resilient body provided with fastener means for fastening both to the structure of the vehicle and to said exhaust pipe.

A device of that type is shown in FIG. 1 of the accompanying drawings, FIG. 2 being an equivalent theoretical diagram, and FIG. 3 being a graph of the stiffness obtained K as a function of the frequency f of the vibration acting between the fastening means 1 and 2 of the device's resilient body 3, e.g. made of rubber. In FIG. 2, it can be seen that the device behaves like a spring R in parallel with a dashpot C, the entire assembly being mounted between the structure 6 of a motor vehicle and its exhaust pipe 7. The drawback of that prior technique can be seen in FIG. 3 and lies in dynamic stiffening, where the stiffness K increases with frequency f. Damping of idling modes, and of choppiness in the exhaust assembly is poor, i.e. there is poor damping of the first excitation mode of the exhaust pipe, in the range about 8 Hz to 15 Hz.

Another technique, shown diagrammatically with reference to FIGS. 4 to 6 which are respectively analogous to FIGS. 1 to 3, makes use of a single oscillating mass: the resilient body 3' of the device includes an oscillating mass m. In FIG. 6, the solid line response is that of the device without additional mass, analogous to the response of FIG. 3, and the dashed line response is the response of the device with the addition of the mass m. Comparing the two curves shows that high frequency vibration is filtered better (significant reduction in stiffness K above 300 Hz), but this is to the detriment of low frequencies. In particular, a very troublesome stiffness peak is obtained around 200 Hz. In addition, in this case also there is poor damping of choppiness in the exhaust assembly and of idling modes.

In yet another known technique, shown in FIG. 7, the resilient body 3" of the device has an oscillating mass M between its two side filter arms 4 and connected to said arms via resilient sections 5 made of rubber. Compared with the standard curve visible as a solid line in the graph of FIG. 8, it can be seen that the response of that device with an oscillating mass M (dashed line curve) does indeed have a stiffness minimum around 150 Hz, but that it too has a significant stiffness peak at about 120 Hz or 130 Hz, and that is likewise prejudicial to good filtering by the device at those frequencies.

The object of the invention is to improve that type of device by eliminating the stiffness peak or by shifting it to higher frequencies, where it will be less troublesome. In other words, it is desirable to be able to design an oscillating mass and a situation for it so as to obtain a stiffness minimum followed by a phase peak, prior to the stiffness peak, i.e. at a lower frequency.

To achieve this result, a device of the invention, of the general type defined at the beginning, is characterized in that it includes at least two transverse rigid bars each carrying a counter-oscillating mass, the ends of said bars remote from said mass being included in zones of said body which is subject to vibration, and said bars being held in a location situated between said respective and said masses by portions of said body, forming pivots.

The principle of the invention thus lies in the fact that because of the lever function of said transverse bar, the mass fixed to the device moves in the opposite direction to vibratory stress acting on the device, with this phenomenon increasing at low frequencies.

The equivalent theoretical diagram of a suspension device of the invention is shown in FIG. 9;

Figure 1:
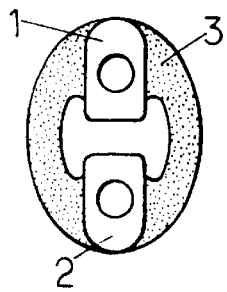
Figure 2:
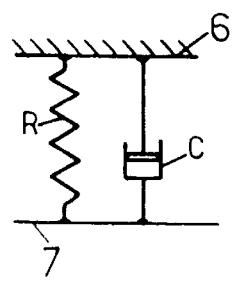
Figure 3:
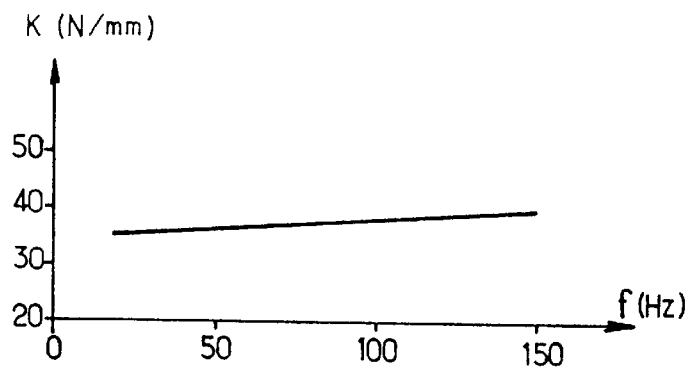
Figure 4:
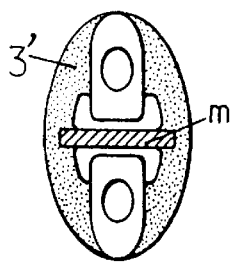
Figure 5:
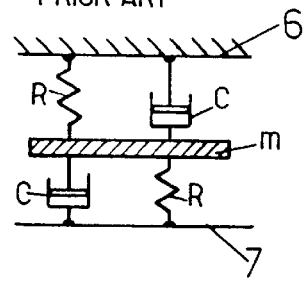
Figure 6:
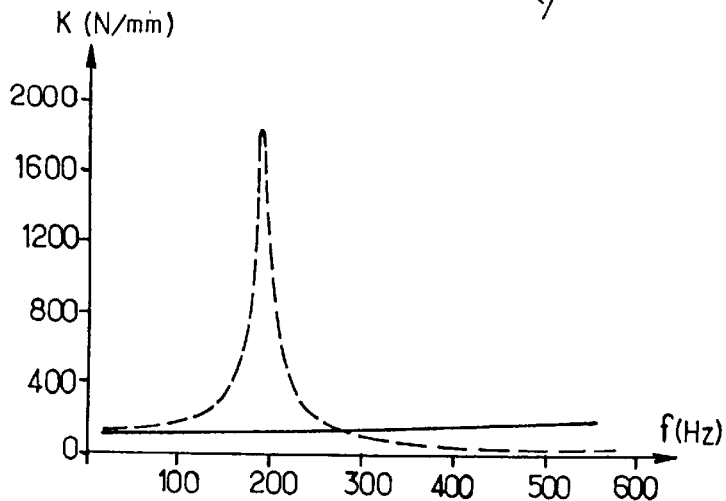
Figure 7:
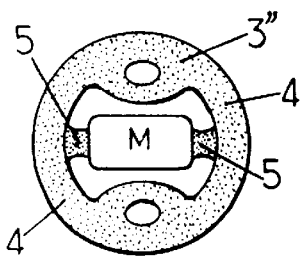
Figure 8:
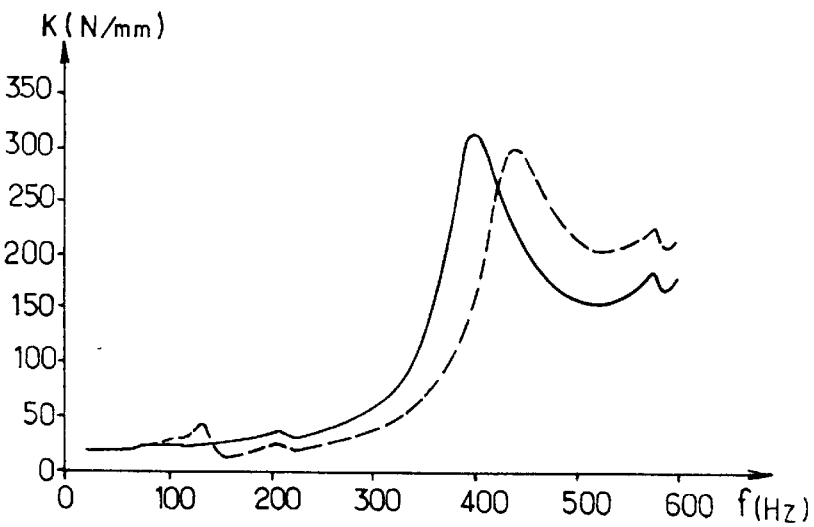
Figure 9:
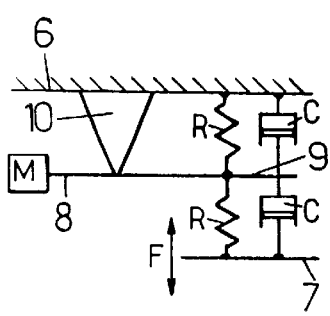

In FIG. 9, the structure of the vehicle still has reference 6 and its exhaust pipe is referenced 7. The suspension device includes a resilient body that is assumed to be in two parallel branches and can be represented by a series connection of two springs R connected in parallel with respective dashpots C that are likewise connected in series. A counter-oscillating mass M is fixed to the end of a rigid bar 8 whose opposite end 9 is included in a middle zone of the two-branch body, which is subject to vibration (arrow F) coming from the exhaust pipe 7. In accordance with the invention, the bar 8 is held at a location situated between the mass M and its end 9 by a pivot-forming portion 10 shown arbitrarily as being fixed to the structure 6 of the vehicle.

With this disposition of the invention, it can be seen that any vertical vibration acting on the end 9 of the bar 8 gives rise to vibration of the mass M in the opposite direction: it is thus indeed a "counter-oscillating" mass.

Figure 10:
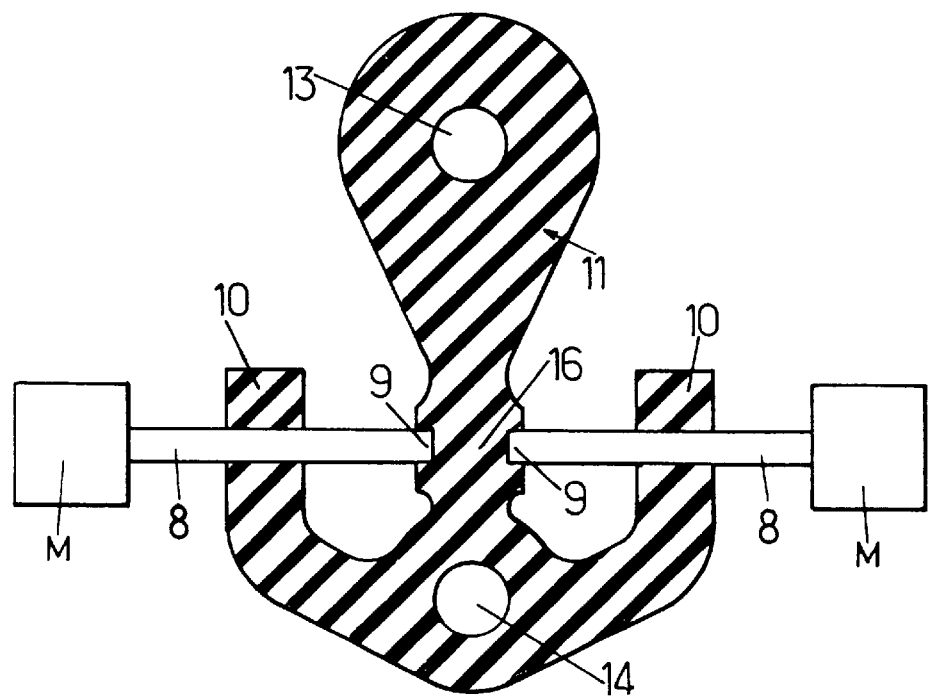
FIG. 10 shows a first practical embodiment of a device of the invention.

In the practical embodiment of FIG. 10, there is shown a suspension device having an elongate rubber body 11 that is generally anchor-shaped with two "flukes" or portions 10. The holes 13 and 14 serve to receive any appropriate fastener members firstly for fastening to the structure of a vehicle and secondly for fastening to its exhaust pipe (not shown in the figure). Two rigid bars 8, e.g. of rubber-coated steel, have respective ends 9 engaged in the middle zone 16 of the body 11 that is subjected to the vibration. These bars 8 pass through the pivot-forming portions 10, and each of them carries a counter-oscillating mass M at its outside end, which mass may form an integral portion of the corresponding bar 8, for example, and may likewise be coated in rubber to avoid corrosion. It should be observed that the pivot function of the branches 10 could be improved by stiffening the branches by interconnecting them by means of internal reinforcement.

Figure 11:
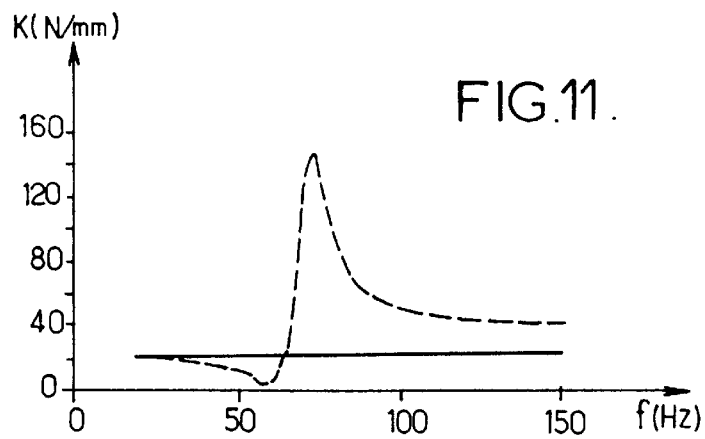
FIG. 11 is a graph showing how stiffness K of the device varies as a function of vibration frequency f.
Figure 12:
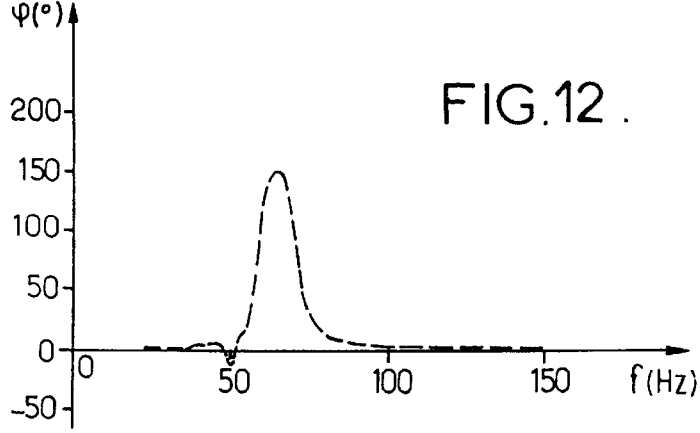
FIG. 12 is a graph showing how the phase φ varies as a function of frequency f.

With such an assembly, the stiffness K and the phase φ response are shown in FIGS. 11 and 12 respectively, using the same conventions as before. It can be seen that the invention makes it possible to obtain a marked stiffness minimum around the favorable frequency of 60 Hz (good filtering when idling), and a corresponding increase in phase at the same frequency, with the phase peak making it possible to provide damping with choppiness in the exhaust assembly.

Figure 13:
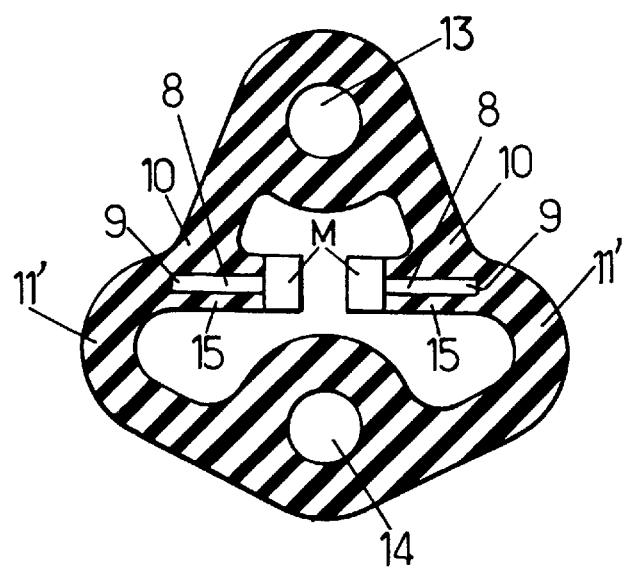
FIG. 13 shows a second practical embodiment of the device.

Analogous results can be obtained with the embodiment of FIG. 13, in which the resilient body 11' of the device is in the form of a ring with two reentrant arms 15 incorporating the two rigid bars 8 and carrying the counter-oscillating masses M at the inside ends of said bars. The ends 9 of these bars are subject to vibration from the exhaust pipe, and their pivots are situated in intermediate zones, again referenced 10. Compared with the preceding embodiment, this embodiment has the advantage of being more compact, and the metal masses can be completely incorporated in the rubber of the body 11'.

What is claimed is:

1. A resilient suspension device for the exhaust pipe of a vehicle having an internal combustion engine, the device comprising a resilient body provided with fastener means for fastening both to the structure of the vehicle and to said exhaust pipe, the device being characterized in that it includes at least two transverse rigid bars (8) each carrying a counter-oscillating mass (M), the ends (9) of said bars remote from said mass (M) being included in zones (16) of said body which are subject to vibration, and said bars (8) being held in a location situated between said respective zones (16) and said masses (M) by portions (10) of said body, forming pivots.

2. A device according to claim 1, characterized in that said resilient body (11) has two portions (10), each of which constitutes said portion forming a pivot for said respective transverse rigid bars (8) passing therethrough, wherein each bar includes a free end carrying a counter-oscillating mass (M) and wherein each bar includes an end (9) opposite to said free end received in a middle zone (16) of the body (11) that is subject to the vibration.

3. A device according to claim 1, characterized in that said resilient body (11') is generally ring-shaped, having two reentrant arms (15), each incorporating a rigid bar (8) carrying a counter-oscillating mass (M) at its inside end, with the opposite end (9) of the corresponding bar being included in a zone that is subject to the vibration.

4. A device according to claim 1, characterized in that said bar (8) and said mass (M) are coated in rubber.

\* \* \* \* \*